United States Patent [19]

Zahn et al.

[11] Patent Number: 4,575,226
[45] Date of Patent: Mar. 11, 1986

[54] PHOTOGRAPHIC ROLLER COPIER APPARATUS

[75] Inventors: Wolfgang Zahn, Munich; Erich Nagel, Anzing; Bernd Payrhammer, Munich, all of Fed. Rep. of Germany

[73] Assignee: Agfa-Gevaert AG, Leverkusen, Fed. Rep. of Germany

[21] Appl. No.: 713,269

[22] Filed: Mar. 18, 1985

[30] Foreign Application Priority Data

Apr. 4, 1984 [DE] Fed. Rep. of Germany ....... 3412691

[51] Int. Cl.$^4$ ...................... G03B 27/52; G03B 27/70
[52] U.S. Cl. ......................................... 355/43; 355/51; 355/60; 355/66; 355/75
[58] Field of Search ....................... 355/43, 51, 65, 46, 355/50, 60, 66, 75

[56] References Cited

U.S. PATENT DOCUMENTS

| | | | |
|---|---|---|---|
| 3,511,565 | 5/1970 | Harman, Jr. et al. | 355/75 X |
| 3,558,225 | 1/1971 | Kirchoff | 355/60 X |
| 3,894,800 | 7/1975 | Rotter | 355/66 X |
| 4,336,996 | 6/1982 | Cattelani et al. | 355/43 X |
| 4,505,561 | 3/1985 | Beckman et al. | 355/66 X |

*Primary Examiner*—Richard A. Wintercorn
*Attorney, Agent, or Firm*—Michael J. Striker

[57] ABSTRACT

A photographic roller copier apparatus for photographing original copies having different side lengths onto a ribbon form copier material, the ribbon width corresponding to a desired copy size. The original copies have various formats and are provided in ribbon form, one format lying lengthwise in the ribbon direction and the other format perpendicular thereto. The apparatus consisting of a lens having an adjustable focal length so that from both formats of originals it is possible to make copies that are equal in size and that fill the width of the copier material ribbon, and that in the area of a picture gate the ribbon of originals is provided in a plane parallel to the lens axis. Between the picture gate end of the lens is provided a deflecting part which deflects the beams of light from the picture gate through 90° into a lens. The picture gate with the ribbon of originals, the illuminating apparatus and corresponding film rollers is rotatable around the lens axis through 90° to a smaller format position.

11 Claims, 5 Drawing Figures

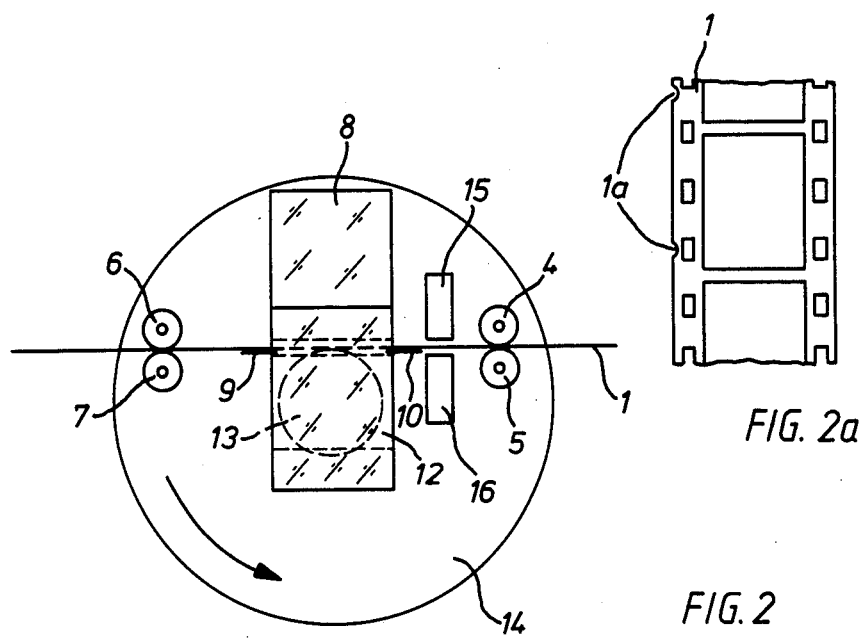
FIG. 2
FIG. 2a
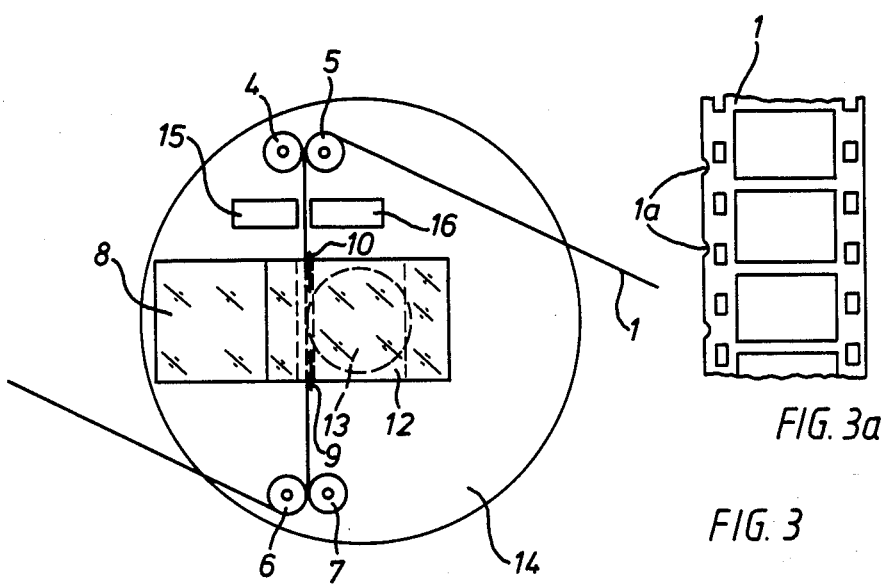
FIG. 3
FIG. 3a

PHOTOGRAPHIC ROLLER COPIER APPARATUS

BACKGROUND OF THE INVENTION

The invention relates to a photographic roller copier apparatus.

Through the inflow of cameras with so-called half-format 18 by 24 mm. on so-called microfilm, and through organized variations in copier arrangements caused by gluing together the undeveloped film into long ribbons, the following problem results. That film ribbons made of a number of films often include films having originals of different size. From the German Pat. No. 1953015 a roller copier device is already known that copies rolls of originals that include films having originals with different formats. The known roller copier device has an automatic targeting device that closes the picture gate on the respective original size in correspondence to the markings on the film edge or at the beginning of the film. The above-described device gives the following result. By a constant held scale of reduction, copies drawn from the so-called half-format originals having a measurement of 18 by 24 mm, will be half as large as those drawn from the microfilm originals having a measurement of 24 by 36 mm. This result is unsatisfactory to the photo enthusiast.

SUMMARY OF THE INVENTION

It is an object of the present invention to provide a roller copier apparatus that makes uniform size copies of originals having various sizes, and that can fit the uniform copies on the width of the copier material ribbon.

Pursuant to this object, and others which will become apparent hereafter, one aspect of the invention resides in a lens having an adjustable focal length, or two exchangeable lenses facing each other and having different focal lengths. Also in the present invention, the distance between the gates of the originals and the copier material can be changed by additional sliding of the picture gates along the film track, which is not possible when using rotating prisms.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a horizontal view of the apparatus in FIG. 1 in the setting for originals lying lengthwise to the ribbon's lengthwise orientation;

FIG. 2A shows the lengthwise ribbon orientation of the originals pursuant to the setting shown in FIG. 2;

FIG. 3 is a horizontal view of the apparatus in FIG. 1 in a setting for originals that are lying transverse to the lengthwise orientation of the ribbon; and FIG. 3A shows the originals lying on the ribbon transverse to a lengthwise ribbon orientation as described in FIG. 3.

DETAILED DESCRIPTION OF THE PREFERRED EMBODIMENTS

Figure 1:
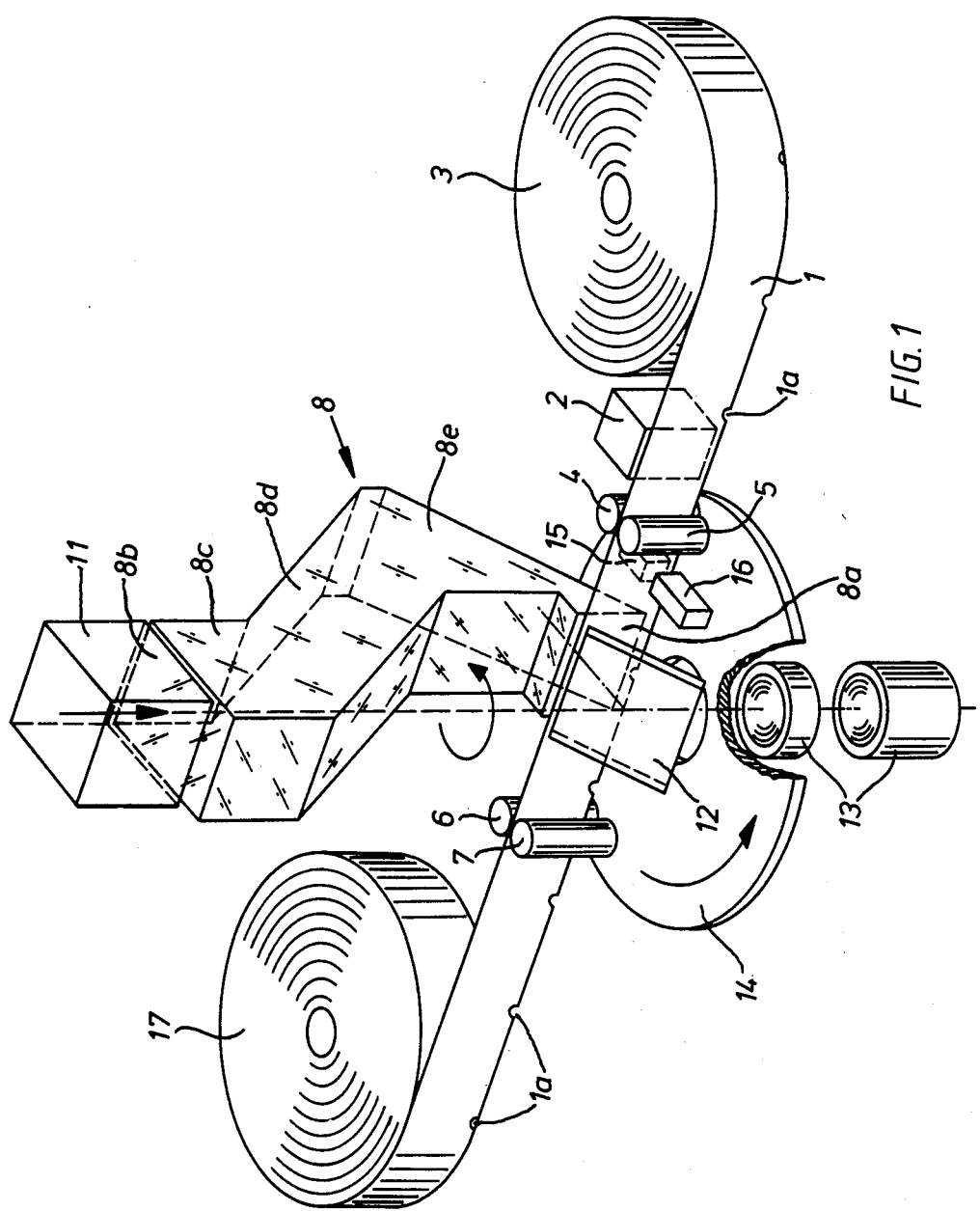
FIG. 1 is a perspective view of a roller copier apparatus according to the invention.

In FIG. 1 a film ribbon 1 is shown, that is made by known method, for example, as in German Pat. No. 1953015, by gluing together a large number of single films, the films having originals with different formats, namely 24 by 36 mm and 18 by 24 mm. Each picture original is provided on its edge with a notch 1a at a fixed distance to a preceding picture edge. The notches 1a are mechanically or photoelectrically sensible for transporting the film ribbon in the copier position. Alternatively, the ribbon of originals can also be provided in a known way with a particular marking on the adhesive position which is automatically sensible and gives a signal for the format of the original that is detectable in the next following film. As well as the interval between successively following picture notches, a sensing of a size identification on the adhesive position according to German Pat. No. 1953015, can be sensed by a sensing station 2 which follows along the film path. A supply spool 3 with a vertical standing axis uncoils the film in a vertical plane.

The transporting direction of the film in FIG. 1 is from right to left. In this direction are provided two transport roller pairs 4,5 and 6,7 between which is inserted a copier station which has a picture gate 8a and a photoconducting body 8. The picture gates can be provided for example by a pressure plate, which is not shown in the drawings. The size of the picture gate conforms to the larger size format 24 by 36 mm which lies in the longitudinal ribbon direction. A smaller transverse lying format of 18 by 24 mm is positioned centrally in the gate, whereby to cover the not used joint face a pusher 9, 10 is provided that is slidable in film transport direction, as indicated in FIGS. 2 and 3. Furthermore, a sensing device 15, 16 for the picture notches 1a is located immediately before the picture gate. The sensing device 15, 16 consists of a light source, for example, a photodiode, and a light receiver, that is struck by a light through one of the notches. After passing through the picture gate, film 1 is coiled onto a take-up spool 17.

Above the copier station there is provided a lamp housing of customary design which includes a lamp, a reflector and a light conducting chute 11 having square cross-section. Of these only the light conducting chute 11 is shown in the drawing. The light conducting body that can be for example a massive outwardly mirrored glass body, attaches to the light conducting chute 11. Light conducting body 8 consists of a light inlet area 8b followed next by a square shaped section 8c, on which is connected a rhombus prism 8d turns the light stream in the body 8 toward the back of the body 8 until it is behind the axis of the lamp housing body. Next follows a prismatic section 8e which has as a light exit area the vertical standing control surface 8a which is parallel to the film plane. The prismatic section 8e also bends the light stream so that it strikes from behind an original to be copied that is positioned in the copier position.

In the direction of the light stream, a mirror 12 is located behind the copier original at an angle of 45° to the film plane. The mirror 12 bends the copier light stream downward to a photograph lens 13 which is of a known design and has an adjustable focal length, and also has an electromotor drive to adjust the focal length. At an appropriate distance below the lens 13, but not shown in the drawing, a guiding arrangement for ribbon-shaped copy materials is provided. The running direction of the guiding arrangement is parallel to the running direction of the film 1 as shown in FIG. 1.

The transport rollers 4, 5 and 6, 7, the light conducting body 8, the pusher 9, 10 and the mirror 12 are all arranged on a turntable 14. The turntable 14 is turnable through 90° in the clockwise direction about the axis of the lens 13 by an appropriate drive, and is also turnable back to its original position.

In FIG. 2 is a plan view of the apparatus shown in FIG. 1 having parallel film and paper drive for originals lying in longitudinal direction of the film as shown in FIG. 2A.

FIG. 3 illustrates the arrangement of FIG. 2 with the turntable 14 turned through 90°. Due to the easy uncoilability of the film from the supply spool 3, the necessary length of film is uncoiled to provide the loops shown without pulling away the film from the copier station. In this setting the film reel runs transverse to the running direction of the paper. In this manner the picture originals are turned 90° to the paper. In FIG. 3 the pushers 9 and 10 are changed from their position in FIG. 2 by pushing them inwards so that only an area for smaller formats of originals, 18 by 24 mm as shown in FIG. 3A, is left open. The movement drive for the pushers from setting in FIG. 2 to the setting in FIG. 3 can be accomplished through, for example, a gear or lever mechanism activated by the movement of the turntable 14 from the position in FIG. 2 to the position in FIG. 3.

The entire photographing device as shown in FIG. 1 is so designed that it can be either a supplemental or exchangeable unit which can be attached to an existing roller copier apparatus. In addition to this, it is necessary to have photographing spools that are turned 90° from horizontal for the spools 3 and 17, or, alternatively, a sufficiently long film path must be present to allow twisting at any time through 90° between the spools and the picture gate 8a.

The method of operation of the roller copier apparatus will next be described. Beginning with the setting of the picture arrangement as shown in FIG. 1, the beginning of a film enters on the sensing arrangement 2 and the format of the original in the following film is sensed and examined to determine if the setting for the respective original is correct. If it is for example a film with a lengthwise lying original of the format 24 by 36 mm, the copying can be immediately begun. When the notch 1a of the first original passes through the notch sensor 15, 16 a signal is given which causes the film to be moved a fixed step amount to stop the original in the picture gate. The pressure plate with the masks 9, 10 at a suitable clearance, presses the original onto the picture gate 8a.

Next, the mirror 12 causes a reflection between the original the copier material, producing an inverted picture. To arrive at a correctly oriented picture, the lighting must be copied through the film carrier with the sensitized side of the film turned to the picture gate 8a. The illumination of the original 1 comes through the lamp housing 11, passes through a colored filter installation not shown in the drawing, and then passes through the light conducting body 8 which bends the light stream from the lamp housing rearward and then bends light stream from the back horizontal onto the original. Next, the mirror 12 or a prism reflects a picture of the original downward through the lens 13 and the original is photographed in a lengthwise direction on the copier material and within the appropriate scale so that the width of the copier material is completely filled.

The actual copier process runs in a known method, controlled by colored filter installation and a shutter. All of the originals on the film are copied in a similar manner. By passing the joining position to the next film after the sensing station 2, the format of the originals in this next film is determined and examined to see if the setting of the turntable 14 matches the determined original format. If the setting of the turntable 14 does not match the format of the next film, the drive for the turntable 14 turns the turntable 14 along with the rollers and the light conducting body 8 around the axis of the lens 13 to the position shown in FIG. 3. Also, the lens is set to a larger scale and the pusher masks 9, 10 are moved to the position shown in FIG. 3. In this position the photographing system will also photograph originals having a smaller format lying transverse to the lengthwise film direction, as shown in FIG. 3A, and the lengthwise direction and the paper ribbon, and with the paper width completely filled.

During the pivoting motion of the turntable the film is held secure in the picture gate so that the necessary length of film for turning around the rollers 4 or 7 can be drawn from the spools 3 or 17.

The apparatus is also useable when the paper ribbon width equals the length of the desired copy. The rotation through 90° then adjusts for originals having a format 24 by 36 mm lying in the lengthwise film direction.

While the invention has been illustrated and described as embodied in a photographic roller copier apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Photographic roller copier apparatus for photographing originals having different side lengths onto a ribbon shaped copier material, the ribbon width corresponding to a desired copy size, the originals being arranged in a ribbon form and having varying formats, one format lying in the lengthwise ribbon direction and the other format lying transverse thereto, said roller copier apparatus comprising: an illuminating device; lens means having an axis and a variable focal length, said focal length being variable to the extent that copies of equal size that fully fill the width of the copier material ribbon can be made from both original formats; a picture gate in the area of which the ribbon of originals is led in a plane parallel to said lens axis; a deflecting part located between said picture gate and said lens which deflects a path of flight from said picture gate through 90° into said lens; and a plurality of transport roller pairs for guiding said ribbon of originals, said picture gate, said deflecting part, said illuminating device, the ribbon of originals and said transport roller pairs being rotatable together through 90° about said lens axis to provide a smaller format position and a larger format position.

2. Roller copier apparatus as defined in claim 1, wherein said lens means includes two exchangeable lenses having different focal lengths.

3. Roller copier apparatus as defined in claim 1, wherein said lens means is a lens having an adjustable focal length.

4. Roller copier apparatus as defined in claim 1, wherein said illuminating device includes a lamp housing parallel to said lens axis and a deflecting element located so that it deflects light from said lamp housing into said picture gate.

5. Roller copier apparatus as defined in claim 4, wherein said deflecting element is a mirror.

6. Roller copier apparatus as defined in claim 4, wherein said deflecting element is a prism.

7. Roller copier apparatus as defined in claim 4, wherein said lamp housing is a supplemental unit oriented on said lens axis and further has an exit face; and further comprising a prismatic light conducting body located between said lamp housing exit face and said picture gate, said light conducting body being rotatable with said picture gate, said light conducting body being formed to transfer light from said lamp housing around the position of the plane of the ribbon of originals and opposite to said lens axis, and to further deflect the light into said picture gate.

8. Roller copier apparatus as defined in claim 1, wherein one said film roller pair is located before said picture gate and another said film roller pair is located after said picture gate, said film roller pairs being rotatable with said picture gate.

9. Roller copier apparatus as defined in claim 1; and further comprising at least one pusher located on said picture gate, and wherein said picture gate has a predetermined opening, said pusher being settable to produce the size of said opening to accommodate the smaller format when rotated into said smaller format position.

10. Roller copier apparatus as defined in claim 9; and further comprising a format mark located on said ribbon of originals, and a sensing device which senses said format mark and thereby controls the setting of said pusher and the rotation of said picture gate along with said illuminating device in accordance with the respective format of the original.

11. Roller copier apparatus as defined in claim 9, wherein said ribbon of originals has an edge having notches at fixed distances; and further comprising a sensing device for sensing the distances between said notches and thereby controlling the setting of said pusher and the pivoting motion of said picture gate along with said illuminating device in accordance with the respective format of an original.

* * * * *